United States Patent [19]

Koshigai et al.

[11] Patent Number: 4,724,944

[45] Date of Patent: Feb. 16, 1988

[54] SYSTEM AND METHOD FOR SUSPENDINGLY TRANSPORTING BODIES

[75] Inventors: Akira Koshigai, Saitama; Jiro Nakamura, Yokohama, both of Japan

[73] Assignees: Honda Giken Kogyo Kabushiki Kaisha, Tokyo; Daifuku Co., Ltd., Osaka, both of Japan

[21] Appl. No.: 835,153

[22] Filed: Mar. 3, 1986

[30] Foreign Application Priority Data

Nov. 11, 1985 [JP] Japan .................. 60-253277
Nov. 11, 1985 [JP] Japan .................. 60-253278

[51] Int. Cl.$^4$ ............................................. B65G 17/16
[52] U.S. Cl. ..................... 198/378; 198/680; 104/172.4; 105/156
[58] Field of Search .......... 104/172.4, 172 S, 94; 105/156, 155, 149; 198/378, 680, 474.1, 414

[56] References Cited

U.S. PATENT DOCUMENTS

| | | | |
|---|---|---|---|
| 1,725,264 | 8/1929 | Garnett | 105/156 |
| 1,734,175 | 11/1929 | McCabe | 105/156 |
| 3,426,700 | 2/1969 | Klamp | 104/172.4 |
| 3,854,573 | 12/1974 | Freier | 104/172.4 X |
| 3,926,125 | 12/1975 | Orwin | 104/94 |
| 4,341,161 | 7/1982 | Morita et al. | 105/149 |
| 4,408,539 | 10/1983 | Wakabayashi | 104/172.4 X |
| 4,433,628 | 2/1984 | Wakabayashi | 104/172.4 |
| 4,438,702 | 3/1984 | Rhodes | 104/172.2 |
| 4,457,419 | 7/1984 | Ogami et al. | 198/414 X |
| 4,609,093 | 9/1986 | Taketani et al. | 198/378 |
| 4,638,740 | 1/1987 | Rhodes | 104/172.2 |

FOREIGN PATENT DOCUMENTS

| | | | |
|---|---|---|---|
| 155111 | 12/1981 | Japan | 104/172 S |
| 131615 | 8/1982 | Japan | 104/172 S |
| 593978 | 2/1978 | U.S.S.R. | 198/680 |

*Primary Examiner*—Randolph A. Reese
*Assistant Examiner*—Anthony Knight
*Attorney, Agent, or Firm*—Barnes, Kisselle, Raisch, Choate, Whittemore & Hulbert

[57] ABSTRACT

The system for suspendingly transporting bodies according to the invention comprises a carriage (4) movable along a predetermined path (P) as guided by guide rails (2) and a support (5) mounted to a lower portion of the carriage (4) through suspenders (32A, 32B). The support (5) comprises a support frame (28) tiltable relative to the carriage (4) and a hanger (30) attached to the support frame (28) and rotatable about a vertical axis (29), the hanger (30) being adapted to support a body (X) thereon. The support frame (28) has lock devices (31) for locking the hanger (30). At a specified location there are disposed a release device (51) for releasing each lock device (31) and a hanger handling device (60) which engages the hanger (30) from below to turn it through a specified angle.

4 Claims, 5 Drawing Figures

SYSTEM AND METHOD FOR SUSPENDINGLY TRANSPORTING BODIES

FIELD OF THE INVENTION

The present invention relates to a system and method for suspendingly transporting bodies and, more particularly, to a system and method for transporting automotive bodies supported in suspension for passing them through various stages of operation in an automobile manufacturing line.

BACKGROUND OF THE INVENTION

Conventional systems for suspendingly transporting auto bodies consist generally of carriage means (which comprise a plurality of trolleys) guided by guide rail means and movable along a predetermined path, and support means provided under the carriage means. The support means include a hanger by which an auto body is carried for the required suspension transport.

With such a transport system, the auto body is transported with its longitudinal axis held parallel to the predetermined path. Therefore, if a large number of auto bodies are to be transported in succession, it is inevitable that the path of travel must be excessively long, which means a considerable disadvantage in respect of both time and space. Another difficulty with the conventional transport system is that the directional position of the auto body cannot be changed even when such a change is desirable from the standpoint of ease of operation depending upon the type of work required.

DISCLOSURE OF THE INVENTION

Accordingly, it is the primary object of the invention to provide a transportation system which permits readily changing the directional position of a body or bodies during the transportation thereof.

In order to accomplish this object, the present invention provides a system for suspendingly transporting bodies which includes carriage means movable along a predetermined path as guided by guide rail means and support means provided under the carriage means for supporting a body, the support means comprising a support frame mounted to the carriage means and a hanger attached to the support frame and rotatable about a vertical axis, the support frame being provided with lock means for releasably locking the hanger to the support frame.

According to this arrangement, if the lock means is released from its locking position, the hanger which receives a body is rotatable about said vertical axis relative to the support frame, so that an operator can change the directional position of the body by turning the hanger by hand, for example. Upon reversion of the locking means into the locking position to lock the hanger to the support frame, the body can be transported with its directional position so changed as aforesaid.

According to a preferred embodiment of the invention, said support frame is tiltable relative to the carriage means by pivoting about a horizontal axis traversing said predetermined path and has a pair of upwardly extending front arms and a pair of upwardly extending rear arms, said pairs of front and rear arms respectively having a pair of front guide rollers and pair of rear guide rollers adapted to be guided by two different pairs of auxiliary guide rails.

This arrangement permits a unique transporting mode in which the carriage means travels with one of the guide roller pairs held at a higher level than the other guide roller pair, that is, with the support frame and the hanger (i.e., a body) held in a tilted position. Such a transporting made can often be advantageously employed in an automobile manufacturing line.

According to another preferred embodiment of the invention, the transport system further comprises, at a specified location or each of specified locations along said predetermined path, release means for releasing the lock means and hanger handling means for turning the released hanger through a specified angle.

With this arrangement, the directional position of the body can be changed fully automatically in the following manner. First, the carriage means in movement along said predetermined path is stopped at a position operative with the release means and the hanger handling means. Subsequently, the release means is actuated to release the lock means. The hanger thereby unlocked is then rotated through a specified angle on said vertical axis by the hanger handling means. Finally, the release means are reversed to return the lock means to its initial locking state, consequently allowing the carriage means to travel forward again with the hanger locked to the thus altered directional position.

Various features and advantages of the invention will become apparent from the following description taken in connection with the accompanying drawings.

DETAILED DESCRIPTION

Figure 1:
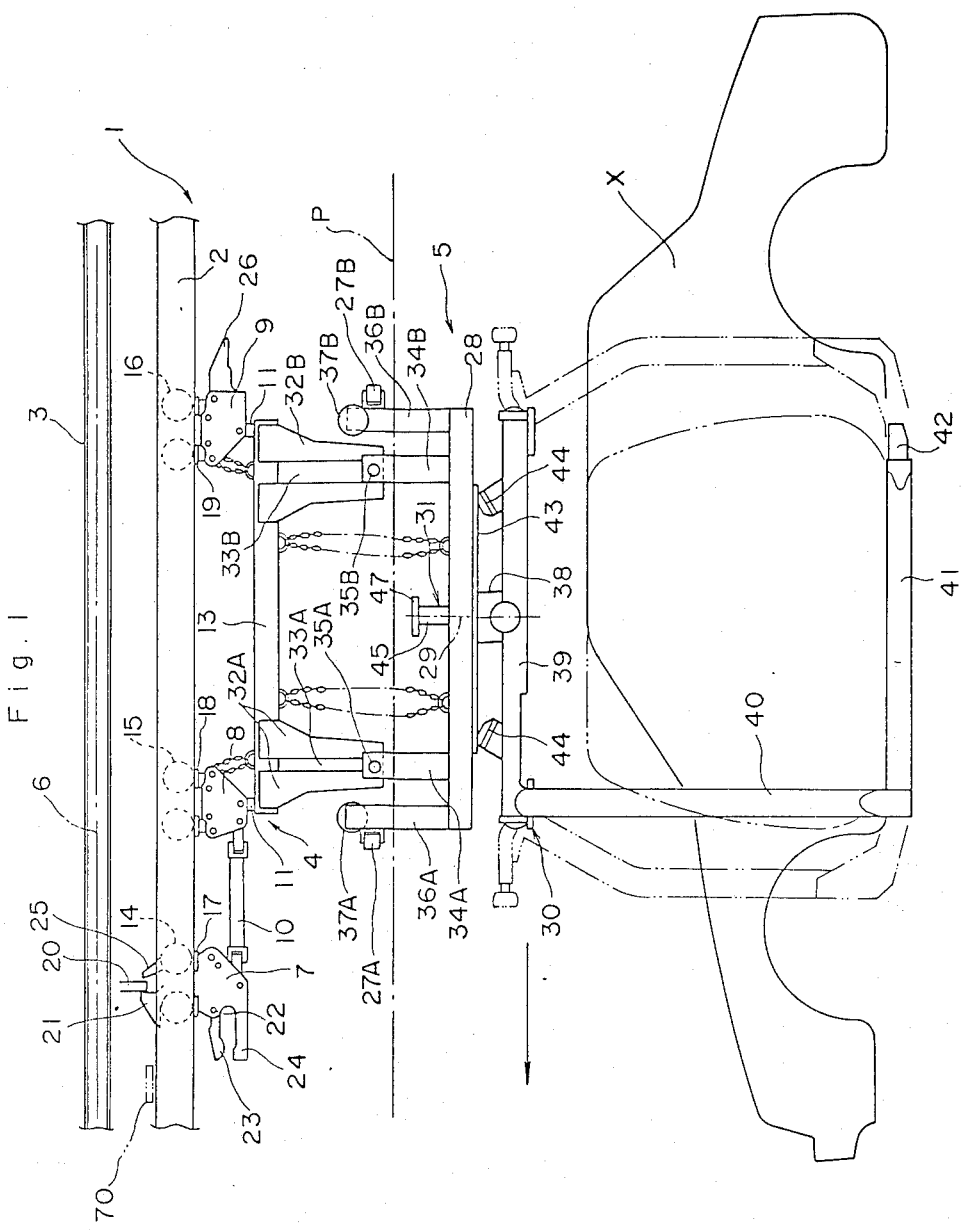
FIG. 1 is a side view showing a trasport system embodying the invention.
Figure 2:
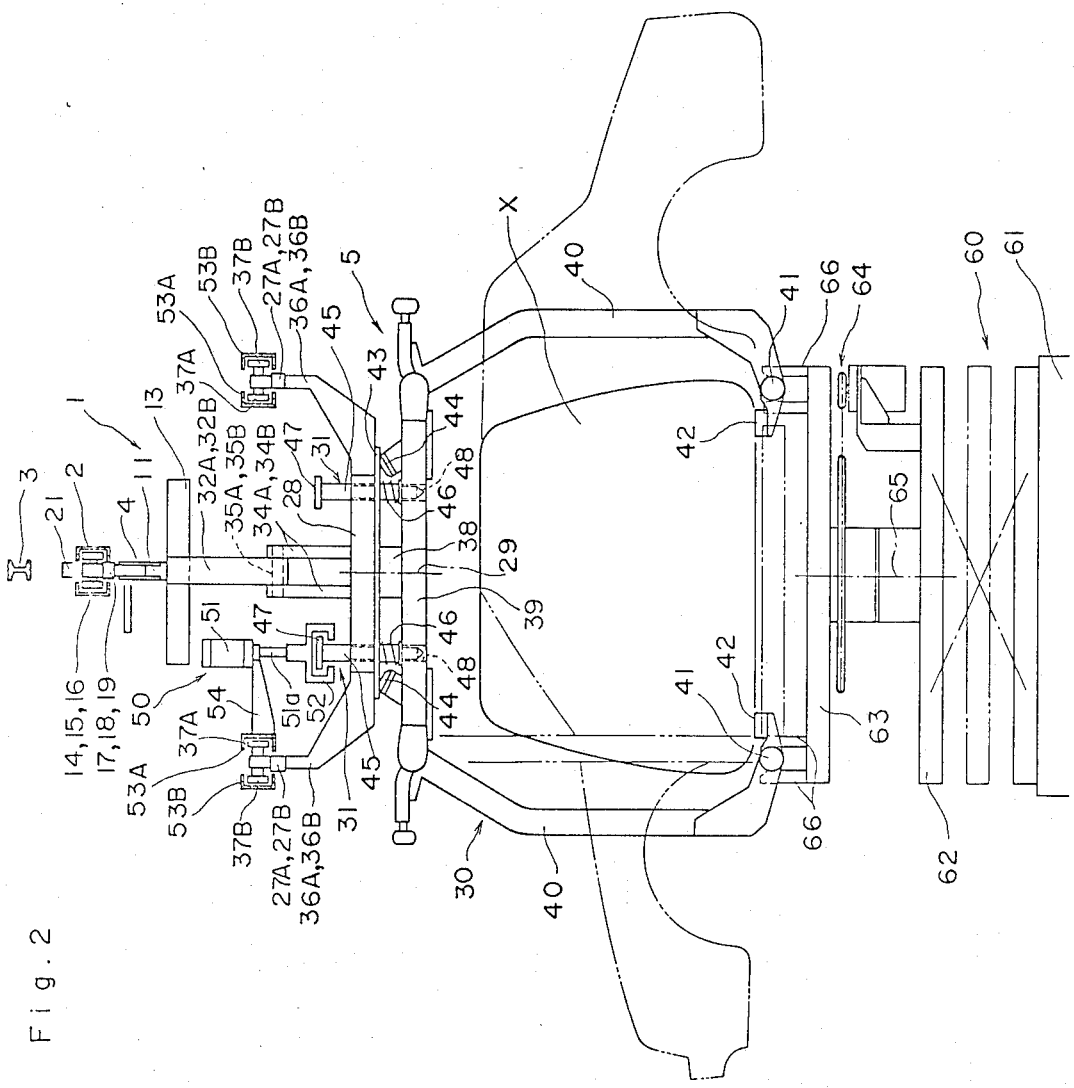
FIG. 2 is a front view of the transport system.

In FIGS. 1 and 2, reference numeral 1 designates a suspension transport apparatus which includes a pair of intermediate guide rails 2 made of channel members, an upper I-beam guide rail 3, a carriage 4 guided by the intermediate guide rails 2 and movable along a predetermined transport path P, and a support 5 provided under the carriage 4. The upper guide rail 3 guides a chain conveyer 6.

The carriage 4 comprises a front trolley 7, a middle trolley 8, and arear trolley 9. The front trolley 7 and the middle trolley 8 are connected to each other through a connecting rod 10. The middle trolley 8 and the rear trolley 9 are respectively connected to a connecting frame 13 through connectors 11 each consisting of a combination of a trunnion and a pin (details of which are not shown). Each trolley 7 (8, 9) has guide rollers 14 (15, 16) guided by the intermediate guide rails 2, and anti-swing rollers 17 (18, 19) for preventing the trolley 7 (8, 9) from laterally swinging. The front trolley 7 has a driven dog 21 engageable with a drive projection 20 extending downward from the chain conveyer 6, the driven dog 21 being adapted to move downward and upward in response to the upward and downward movement of a pivotal lever 23 which is pivotable on a horizontal shaft 22. Normally, the pivotal lever 23 is at its lowermost position due to its weight, so that the dog 21 is at its uppermost position to engage the drive projection 20. Below the lever 23 is provided an stopper member 24 which is adapted to abut the rear trolley of a preceding similar carriage (not shown). Further, the front trolley 7 has a hold dog 25 disposed behind the driven dog 21 and pivotable about a horizontal axis. Normally, the hold dog 25 is brought to its uppermost pivotal position under the biasing force of a weight (not shown). The rear trolley 9 has a rearwardly extending cam tail 26, which is adapted to engage the pivotal lever 23 of the front trolley of a succeeding similar carriage (not shown) to move the lever pivotally upward.

The support 5 includes a support frame 28 disposed below the carriage 4, and a hanger 30 attached to the support frame 28 and rotatable about a vertical axis 29. The support frame 28 has a pair of front brackets 34A, and a pair of rear brackets 34B. Between the upper ends of the front brackets 34A is provided a horizontal front pin 35A, whereas a horizontal rear pin 35B extends between the rear brackets 34B. The front pin 35A and the rear pin 35B are fitted respectively in a front guide slot 33A and rear guide slot 33B respectively formed in a front suspender 32A and a rear suspender 32B. Both suspenders extends downward from the connecting frame 13 of the carriage 4. The front guide slot 33A guides the front pin 35A comparatively closely therein, while the rear guide slot 33B, which is wider than the front guide slot 33A, guides the rear pin loosely therein. Accordingly, the support frame 28 is translationally movable vertically and is also tiltable relative to the carriage 4 by pivoting about a horizontal axis perpendicular to the transport path P. At the front and rear ends of the support frame 28 there are respectively provided a pair of upwardly extending front arms 36A and a pair of upwardly extending rear arms 36B. At the upper ends of the front arms 36A there are disposed a pair of inwardly directed front guide rollers 37A and a pair of anti-swing rollers 27A. The front guide rollers 37A are guided by a pair of inner auxiliary guide rails 53A. At the upper ends of the rear arms 36B there are disposed a pair of outwardly directed rear guide rollers 37B and a pair of anti-swing rollers 27B. The rear guide rollers 37B are guided by a pair of outer auxiliary guide rollers 53B. Auxiliary guide rollers 53A, 53B may be provided either along the overall length of the transport path P, or only along a specified length or lengths of the travel path.

The hanger 30 includes a ceiling frame 39 connected to the support frame 28 through a rotary joint 38. A pair of hook arms 40 extends downward from one end of the ceiling frame 39, and a pair of lateral arms 41 extend horizontally from the lower ends of the hook arms 40. The hook arms 40 and lateral arms 41 are provided respectively with upwardly directed receivers 42 on which an automotive body X is placed. In order to stabilize the rotation of the hanger 30, equiangularly spaced stabilization rollers 44 are arranged on the ceiling frame 39 around the vertical axis 29 for abutment with a stabilization disk 43 mounted on the underside of the support frame 28.

Numeral 31 designates lock devices provided on the support frame 28. Each lock device 31 include a lock pin 45 having a flange head 47 at the upper end thereof. The lower end of the lock pin 45 is normally fitted in selected one of lock holes 48 formed in the hanger ceiling frame 39 under the biasing force of a spring 46.

The lock devices 31 are controlled by release devices 50 (only one shown) provided at a specified location or each of specified locations on the transport path P. Each release device 50, as seen in FIG. 2, comprises a cylinder 51 fixed to a corresponding inner auxiliary guide rail 53A through a bracket 54 and an engagement channel member 52 fixed to the lower end of the piston rod 51a of the cylinder 51. The engagement channel member 52 has a channel extending along the transport path P and adapted to receive the flange head 47 of a corresponding lock pin 45.

Below the release devices 50 is provided a hanger handling device 60 which includes a lift table 62 adapted to be moved upward and downward by a lift drive 61, such as a pantograph mechanism. On the lift table 62 there is provided a turntable 63 which is adapted to turn about a vertical axis 65 by a rotary drive 64 including a motor and a differential transmission mechanism. Plural pairs of engaging fingers 66 extend upward from the turntable 63 to engage, from below, the respective lateral arms 41 of the hanger 30 when the lift table 62 is elevated.

The above described suspension transport system of the invention operates in the following manner.

When the driven dog 21 is in engagement with the drive projection 20, the carriage 4 travels synchronously with the chain conveyer 6. In the state indicated by solid lines in FIGS. 1 and 2, the hanger 30 is so locked to the support frame 28 by the lock devices 31 that the auto body X travels with its longitudinal axis in parallel to the transport path P. In order to change the directional position of the auto body X, a stopper plate 70 which is movable traversely of the transport path P is first caused to plunge into the path of movement of the driven dog 21 at a specified position. As a result, the driven dog 21 is moved downward by the stopper plate 70 to disengage from the drive projection 20, and the stopper plate 70 comes into engagement with the hold dog 25 to stop the carriage 4. At this time the flange head 47 of each lock pin 45 has fitted into the engagement channel member 52 of a corresponding release device 50, and the hanger 30 is located right above the hanger handling means 60. Then, the lift drive 61 is actuated to raise the lift table 62 so that the engagement fingers 66 are brought into engagement with the lateral arms 41 of the hanger 30. Subsequently, the cylinder 51 is actuated to retract the piston rod 51a, so that the lock pin 45 is moved out of a corresponding lock hole 48. The hanger 30, thus unlocked, is caused to turn 90° by actuating the rotary drive 64 to rotate the turntable 63. Finally, the release device 50 is reversed to cause the lock pin 45 to fit into another lock hole 48 positioned 90° away from the previous lock hole, and the lift table 62 is lowered. Thus, upon retraction of the stopper plate 70 from the path of movement of the driven dog 21, the driven dog 21 rises to come into engagement with one of succeeding drive projections (not shown) from the chain conveyer 6, so that the transport of the body X can be resumed. In FIGS. 1 and 2, the auto body X and hanger 30 after change of their directional positions are represented by phantom lines.

During such an orientation changing operation, the auxiliary guide rails 53A, 53B guiding the guide rollers 37A, 37B serve to prevent possible swinging of the support 5.

Figure 4A:
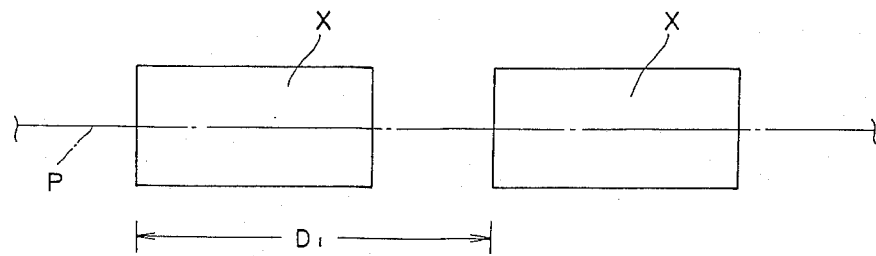
FIGS. 4a and 4b are schematic diagrams illustrating an advantage of the transport system.
Figure 4B:
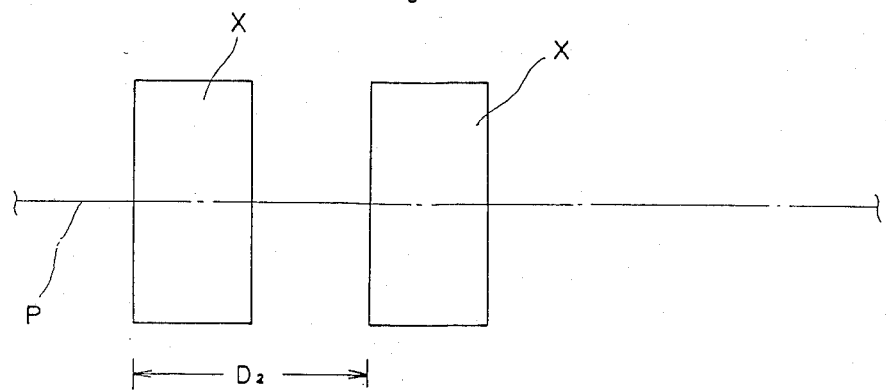

FIGS. 4a and 4b show a comparison in terms of pitch between the lengthwise and widthwise transporting modes of automotive bodies X. It can be seen from these figures that the pitch $D_2$ involved in the widthwise transport is considerably smaller that the pitch $D_1$ in the lengthwise transport.

Figure 3:
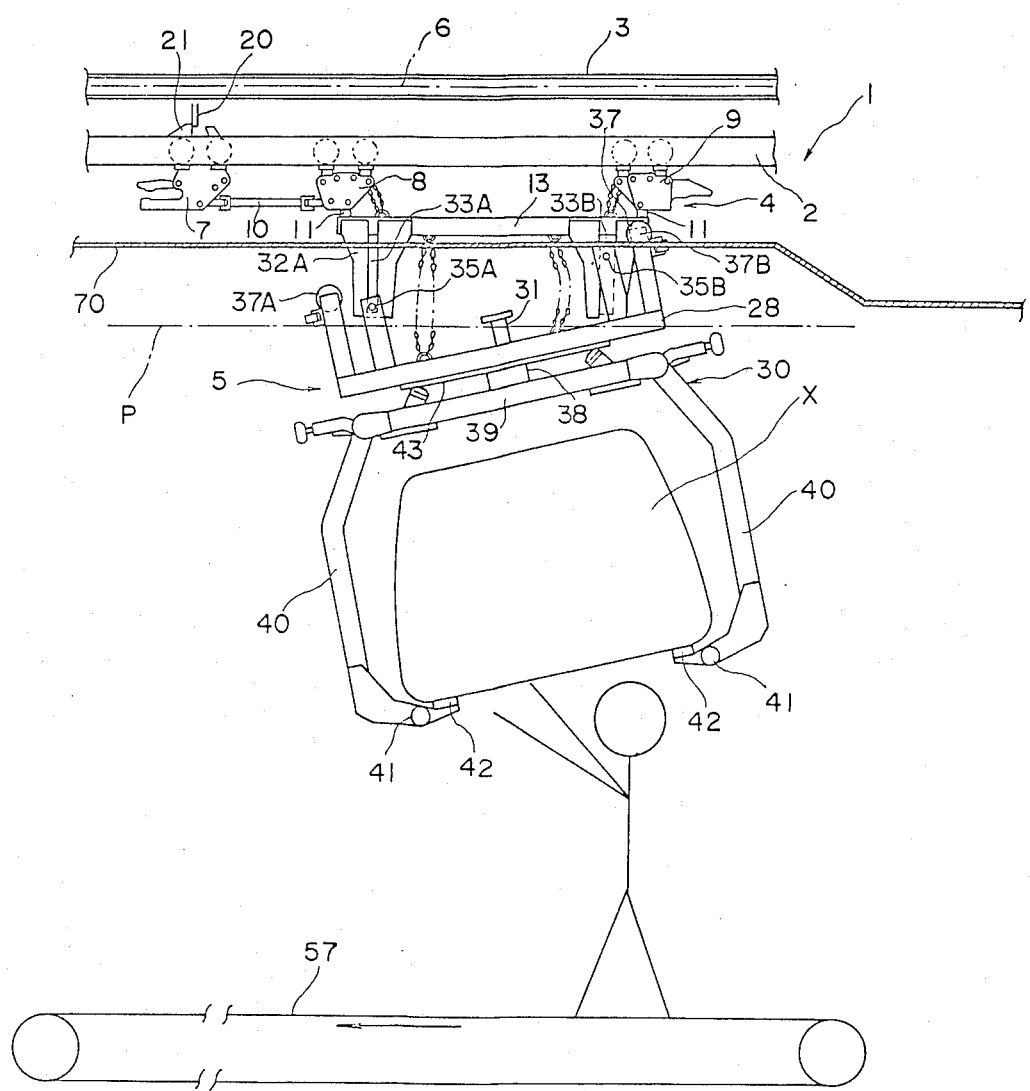
FIG. 3 is a side view showing a preferred transporting made employing the transport system.

As illustrated in FIG. 3, it is possible, during the widthwise transport, to tilt the support means 5 by guiding only the rear guide rollers 37B on tilting guide rails 70 which may be provided as an extension of the outer auxiliary guide rails 53B (FIG. 2). Thus, an operator on a belt conveyer 57 running synchronously with the chain conveyer 6 can easily perform the required operations onto the auto body X. By guiding only the front guide rollers 37A in the same manner as above, it is also possible to tilt the support means 5 rearwardly.

In case the transport path P includes an upward slope and/or a downward slope, the principle of tilting described in connection with FIG. 3 can be employed in maintaining the support means 5 horizontal throughout the entire transport path.

In the example shown, the directional position of the body X is changed from lengthwise to widthwise. A reverse directional change is of course possible. A combination of the release devices 50 and the hanger handling device 60 may be disposed at each of plural locations along the transport path P in order to alternately reversely change the orientation of the body X. Further, instead of the illustrated hanger handling device 60, cylinder means may be horizontally disposed so that the piston rod thereof is stretched out and retracted to give a turning force to the hanger 30.

What is claimed is:

1. A system for suspendingly transporting bodies comprising carriage means movable along a predetermined path as guided by guide rail means; support means provided under the carriage means for supporting a body, the support means including a support frame mounted to the carriage means and a hanger attached to the support frame and rotatable about a vertical axis; lock means for preventing rotation of the hanger with respect to the support frame, including lock holes provided in said hanger, and at least one lock pin which is provided on the support frame and adapted to fit into and be released from a selected one of said lock holes, and a spring urging the lock pin into the lock hole; release means disposed at a predetermined location along said predetermined path and including at least one cylinder which has a piston rod codirectional with the lock pin and, an engagement which is fixed to the front end of the piston rod and permits the lock pin to move into and out of said engagement member; and hanger handling means for turning through a specified angle the hanger when the hanger has been unlocked.

2. A system as set forth in claim 1 wherein said lock pin has a flange head, said engagement member including an engagement channel member which has a channel extending codirectionally with said predetermined path to permit the flange head of the lock pin to move into and out of said channel.

3. A system as set forth in claim 1 further comprising a vertically extending front guide slot provided by the carriage means; a vertically extending rear guide slot provided by the carriage means; a horizontal front pin provided by the support frame and guided comparatively closely in the front guide slot; a horizontal rear pin provided by the support frame and guided loosely in the rear guide slot; and front guide roller means and rear guide roller means provided by said support frame and adapted to be respectively guided by additional guide rail means; whereby the support frame may be tilted relative to the carriage means by pivoting about a horizontal axis traversing said predetermined path, and may be held in its tilted position by portions of said additional guide rail means of different relative heights.

4. A system as set forth in claim 1 wherein the support frame is provided with a horizontal stabilization disk centered on said vertical axis, and the hanger is provided with a plurality of stabilization rollers arranged equiangularly around said vertical axis for abutment with the stabilization disk.

* * * * *